United States Patent
Ma et al.

(10) Patent No.: US 11,727,957 B1
(45) Date of Patent: Aug. 15, 2023

(54) DATA STORAGE DRIVE WITH A VERTICALLY TRANSLATABLE ACTUATOR ARM

(71) Applicant: Seagate Technology LLC, Fremont, CA (US)

(72) Inventors: YiChao Ma, Singapore (SG); Xiong Liu, Singapore (SG); Than Zaw Myint, Singapore (SG); Choon Kiat Lim, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/837,185

(22) Filed: Jun. 10, 2022

(51) Int. Cl.
*G11B 5/48* (2006.01)
*G11B 21/22* (2006.01)

(52) U.S. Cl.
CPC ............ *G11B 5/4873* (2013.01); *G11B 21/22* (2013.01)

(58) Field of Classification Search
None
See application file for complete search history.

(56) References Cited

U.S. PATENT DOCUMENTS

| | | | |
|---|---|---|---|
| 7,944,129 B2* | 5/2011 | Matsuo | H01L 41/0913 310/323.01 |
| 9,202,500 B2 | 12/2015 | Kunkel et al. | |
| 9,853,575 B2* | 12/2017 | Stang | G11B 7/0937 |
| 10,413,912 B2 | 9/2019 | Gascoyne et al. | |
| 11,031,037 B1* | 6/2021 | Garbarino | G11B 17/021 |
| 11,087,790 B2 | 8/2021 | Ramakrishnan | |
| 11,176,963 B1* | 11/2021 | Herdendorf | G11B 5/54 |
| 11,348,610 B1* | 5/2022 | Herdendorf | G11B 5/6058 |
| 11,443,763 B1* | 9/2022 | Ma | G11B 5/4813 |
| 11,468,909 B1* | 10/2022 | Liang | G11B 5/484 |
| 2003/0128456 A1* | 7/2003 | Shitara | G11B 5/5552 |
| 2008/0174901 A1* | 7/2008 | Tanimura | G11B 7/08576 |
| 2008/0207390 A1* | 8/2008 | Tochimoto | H01L 41/0906 476/67 |
| 2008/0297002 A1* | 12/2008 | Oki | H01L 41/0913 310/323.16 |

(Continued)

FOREIGN PATENT DOCUMENTS

| FR | 3058328 A1 | 5/2018 |
|---|---|---|
| TW | 202200268 A | 1/2022 |

(Continued)

OTHER PUBLICATIONS

Q. Lv, Z. Yao, X. Li, "Contact analysis and experimental investigation of a linear ultrasonic motor", Ultrasonics, 81 (2017), pp. 32-38.

(Continued)

*Primary Examiner* — William J Klimowicz
(74) *Attorney, Agent, or Firm* — Westman, Champlin & Koehler, P.A.

(57) ABSTRACT

A data storage device includes a stack of discs mounted on a spindle and a pivot block rotatably mounted around a shaft. The data storage device also includes an arm having first and second ends, with the first end supporting a head and the second end movably attached to the pivot block. The data storage device further includes an ultrasonic piezoelectric actuator that moves the arm along the pivot block to enable the head to interact with data storage surfaces of the discs.

20 Claims, 5 Drawing Sheets

(56) References Cited

U.S. PATENT DOCUMENTS

| | | | |
|---|---|---|---|
| 2009/0015098 A1* | 1/2009 | Matsuo | H02N 2/103 310/317 |
| 2009/0039736 A1* | 2/2009 | Matsuo | H01L 41/273 29/25.35 |
| 2017/0373242 A1* | 12/2017 | Yamada | H01L 41/0815 |
| 2019/0314820 A1 | 10/2019 | Geng et al. | |
| 2020/0227077 A1* | 7/2020 | Sukla | G11B 5/4813 |
| 2021/0170413 A1 | 6/2021 | Zhitomirsky et al. | |
| 2021/0256919 A1 | 8/2021 | French | |
| 2021/0256920 A1 | 8/2021 | Bishop et al. | |
| 2022/0068300 A1* | 3/2022 | Herdendorf | G11B 5/54 |
| 2022/0335970 A1* | 10/2022 | Mendonsa | G11B 5/012 |

FOREIGN PATENT DOCUMENTS

| | | |
|---|---|---|
| WO | 2018093794 A2 | 5/2018 |
| WO | 2021094362 A1 | 5/2021 |
| WO | 2021102134 A1 | 5/2021 |
| WO | 2021161048 A1 | 8/2021 |

OTHER PUBLICATIONS

U.S. Appl. No. 17/351,804, filed Jun. 18, 2021, entitled "Disk Drive With Multiple Actuators on a Pivot Axis", 24 pages.

\* cited by examiner

DATA STORAGE DRIVE WITH A VERTICALLY TRANSLATABLE ACTUATOR ARM

SUMMARY

In one embodiment, a data storage device includes a stack of discs mounted on a spindle and a pivot block rotatably mounted around a shaft. The data storage device also includes an arm having first and second ends, with the first end supporting a head and the second end movably attached to the pivot block. The data storage device further includes an ultrasonic piezoelectric actuator configured to move the arm along the pivot block to enable the head to interact with data storage surfaces of the discs.

In another embodiment, a data storage device includes a first disc mounted on a spindle, with the first disc having a first data storage surface. The data storage device also includes a pivot block rotatably mounted around a shaft and an arm comprising a first and second ends, with the first end supporting a head. The data storage device further includes at least one electromagnetic lock configured to releasably lock the second end of the arm at a first location along the pivot block. At the first location, the arm is rotatable by the pivot block to enable the head to interact with the first data storage surface.

In yet another embodiment, a data storage device includes a stack of discs mounted on a spindle and a pivot block rotatably mounted around a shaft. The pivot block includes a rear portion and a generally cylindrical front portion that is positioned around the shaft. The front portion of the pivot block has an exterior that includes at least one column of vertically-arranged pin holes. Locations of the different vertically-arranged pin holes correspond to locations of respective discs of the stack of discs. The data storage device also includes an arm having first and second ends. The first end of the arm supports a head configured to interact with different data storage surfaces of the stack of discs. The second end of the arm is releasably attachable to the pivot block by insertion of a key of a locking mechanism coupled to the arm into any of the different vertically-arranged pin holes, thereby enabling the head to access the different data storage surfaces.

Other features and benefits that characterize embodiments of the disclosure will be apparent upon reading the following detailed description and review of the associated drawings.

DETAILED DESCRIPTION OF ILLUSTRATIVE EMBODIMENTS

In general, embodiments of the disclosure relate to a hard disc drive (HDD) or a hybrid drive having fewer heads than the number of disc surfaces. This greatly reduces costs associated with the conventionally high numbers of read/write heads and associated systems. In drives having fewer heads than the number of disc surfaces, an arm supporting a head may be moved vertically to enable the same head to interact with different disc surfaces at different times. Some current actuation systems for moving the arm vertically employ a piezo-based brake crawler inchworm that moves relatively slowly and consumes a relatively high level of power.

To address the above problems, embodiments of the disclosure employ an ultrasonic piezoelectric actuator to move the arm. The ultrasonic piezoelectric actuator is capable of moving the arm faster than the piezo-based crawler inchworm and also consumes less power. In embodiments of the disclosure, when the arm is moved vertically to a predetermined position to enable the head to interact with a particular disc surface, the arm is locked in place at that position by an electromagnetic locking system. The actuator arm and the pivot block to which it is coupled are designed to accommodate the ultrasonic piezoelectric actuator and the electromagnetic locking system. Prior to providing details regarding the different embodiments, a description of an illustrative operating environment is provided below.

Figure 1:
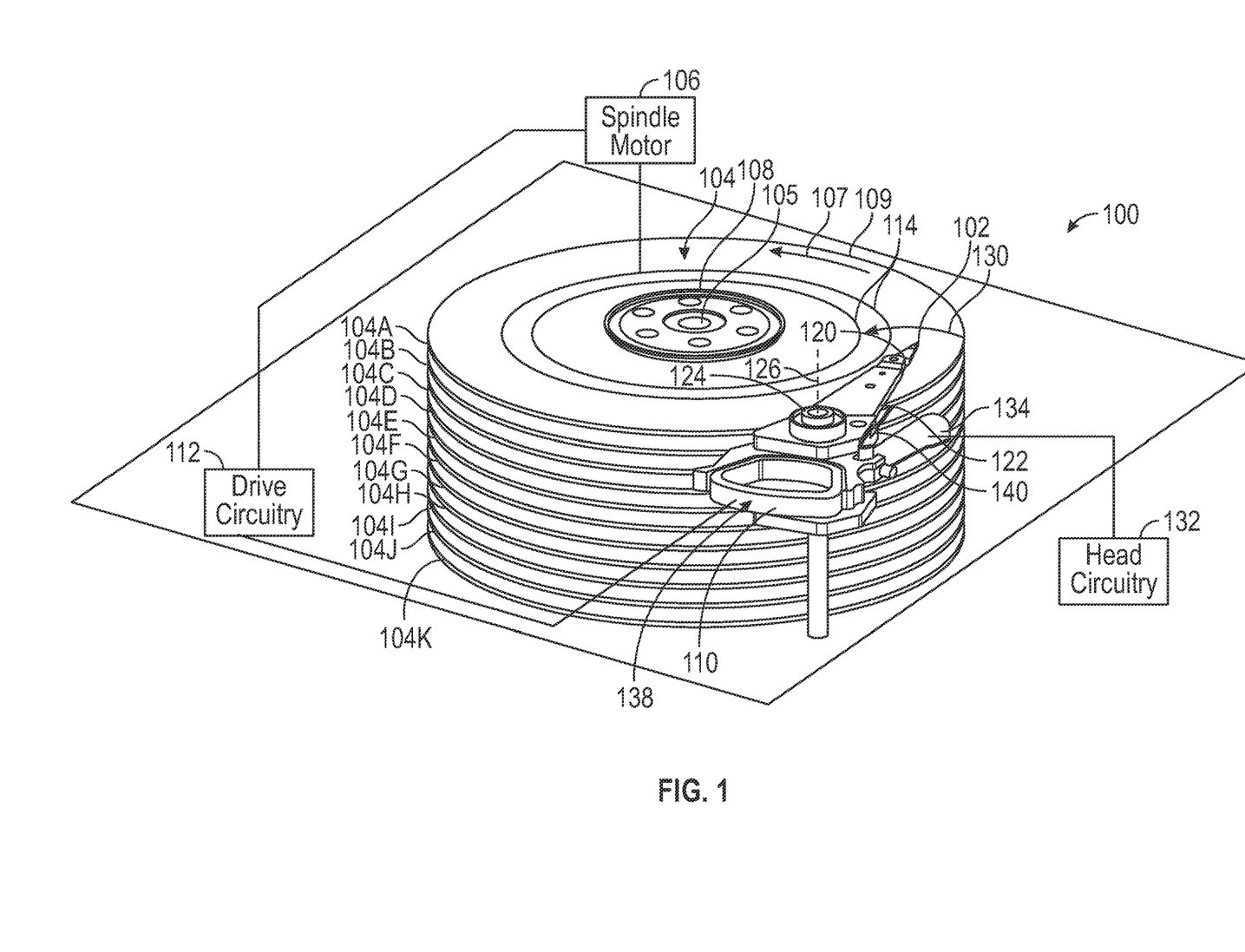
FIG. 1 is a schematic illustration of an exemplary data storage device.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same or like reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device (DSD) 100 including data storage media and heads for reading data from and/or writing data to the data storage media. In DSD 100, heads 102 may be positioned over storage media 104 to read data from and/or write data to the data storage media 104. In the embodiment shown in FIG. 1, the data storage media 104 are rotatable data storage discs stacked on a spindle 105, with each disc 104 having opposing surfaces that serve as data storage surfaces. For read and write operations, a spindle motor 106 (illustrated schematically) rotates the media 104 as illustrated by arrow 107; an actuator mechanism 110 positions the heads 102 relative to data tracks 114 on the rotating media 104 between an inner diameter (ID) 108 and an outer diameter (OD) 109. Both the spindle motor 106 and the actuator mechanism 110 are connected to and operated through drive circuitry 112 (schematically shown).

Each head 102 is coupled to actuator mechanism 110 through a suspension assembly that includes a load beam 120 connected to an actuator arm 122 of the mechanism 110, for example through a swage connection. The actuator mechanism 110 is rotationally coupled to a frame or base deck through a pivot shaft 124 to rotate about longitudinal axis 126 of shaft 124. The actuator mechanism 110 moves the heads 102 in a cross-track direction as illustrated by arrow 130. Each of the heads 102 includes one or more transducer elements (not shown) coupled to head circuitry 132 through flex circuit 134.

In DSD 100, a number of heads 102 is less than a number of disc 104 surfaces. In the particular embodiment shown in FIG. 1, DSD 100 includes eleven discs 104A, 104B, 104C, 104D, 104E, 104F, 104G, 104H, 104I, 104J and 104K with a total of twenty two data storage surfaces; moreover, two heads 102 are carried by the actuator arm 122. The actuator mechanism 110, the actuator arm 122 and the load beam 120 are collectively referred to as a head stack assembly (HSA) 138.

In DSD 100 of FIG. 1, the actuator arm 122 may be moved along axis 126 of shaft 124 to different positions under motive of an elevator 140. In an uppermost position shown in FIG. 1, the two heads 102 coupled to the actuator arm 122 interact with upper and lower data storage surfaces of disc 104A. Actuator 110 controls the rotation of actuator arm 122 about the axis 126 of the pivot shaft 124. To enable movement of the actuator arm 122 along the axis 126 to access a desired different disc 104 (e.g., any of discs 104B-104K), the actuator 110 rotates the arm 122 away from the disc (e.g., 104A), and the elevator 140 then moves the actuator arm 122 along axis 126 to a different vertical position to access the different disc 104 (e.g., any of discs 104B-104K). When the actuator arm 122 is at the different vertical position, actuator 110 may rotate arm 122 to enable the heads 102 to access surfaces of the different disc 104. In embodiments of the disclosure, there are eleven predetermined vertical positions (not shown in FIG. 1) corresponding to the eleven different discs 104. In some embodiments, an electromagnetic locking mechanism (not shown in FIG. 1) may be employed to hold the actuator arm 122 in place at any of the eleven different vertical positions. While the illustrated system has eleven discs 104, it is contemplated that the teachings described herein can be applied to a disc stack including any number of discs stacked on a spindle such as 105. Details regarding the elevator 140 and the locking mechanism for the arm 122 are provided below in connection with FIGS. 2-8.

Figure 2:
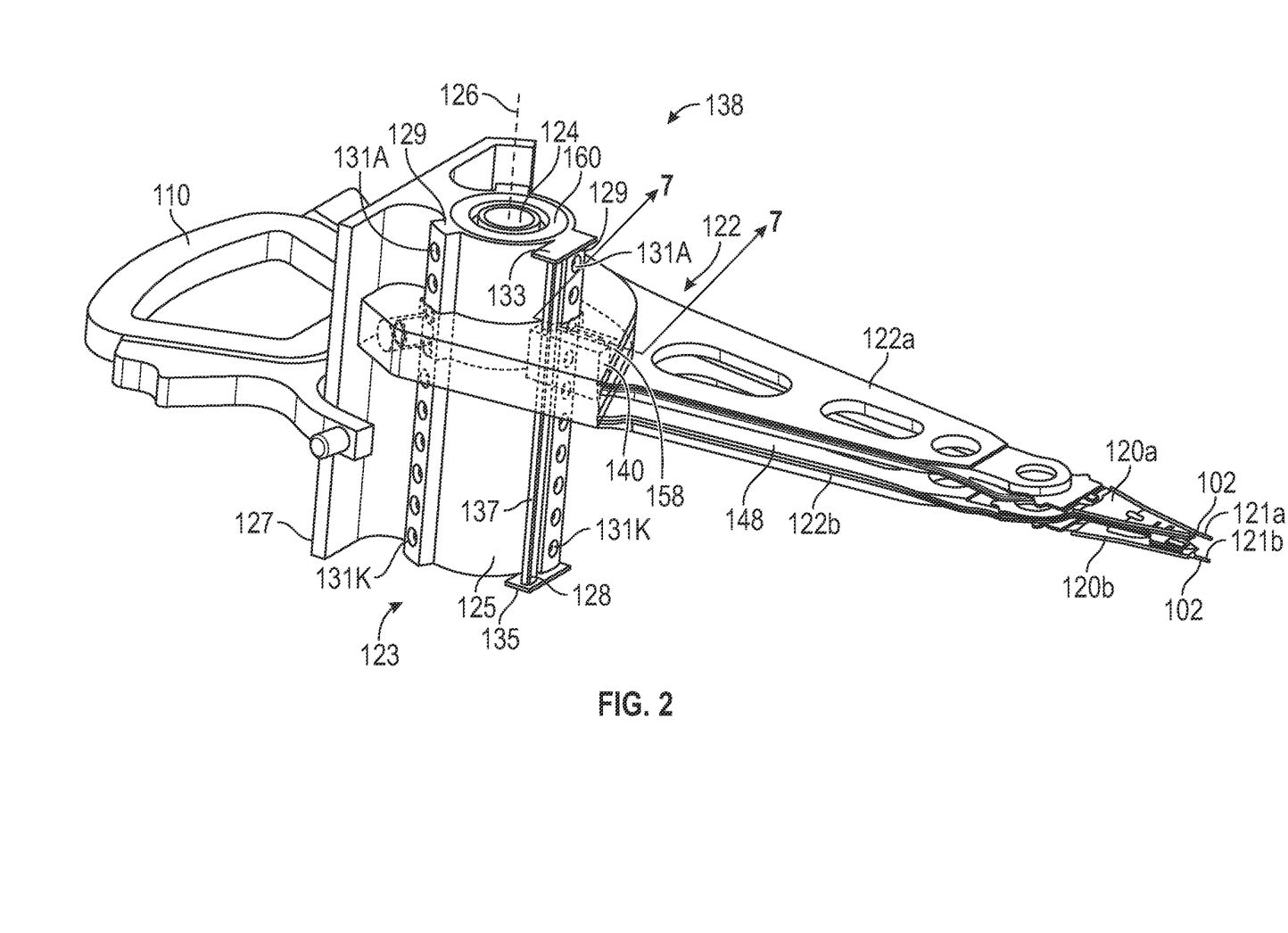
FIG. 2 is a perspective view of a head stack assembly of the data storage device.

FIG. 2 is a perspective view of a HSA 138 in accordance with one embodiment. As shown in FIG. 2, actuator arm 122 includes an upper plate 122a and a lower plate 122b separated by channel 148 sized so that the plates 122a, 122b fit over and under a disc 104 without physically contacting the disc 104. Respective upper and lower load beam portions 120a and 120b are attached to the ends of upper and lower plates 122a and 122b and carry heads 102 for reading and/or writing on top and bottom surfaces of a disc 104. Lift tabs 121a and 121b extend from the load beams 120a and 120b, respectively, to rest on a head support ramp assembly (not shown) when the DSD 100 is in an off or non-operating state.

Figure 3:
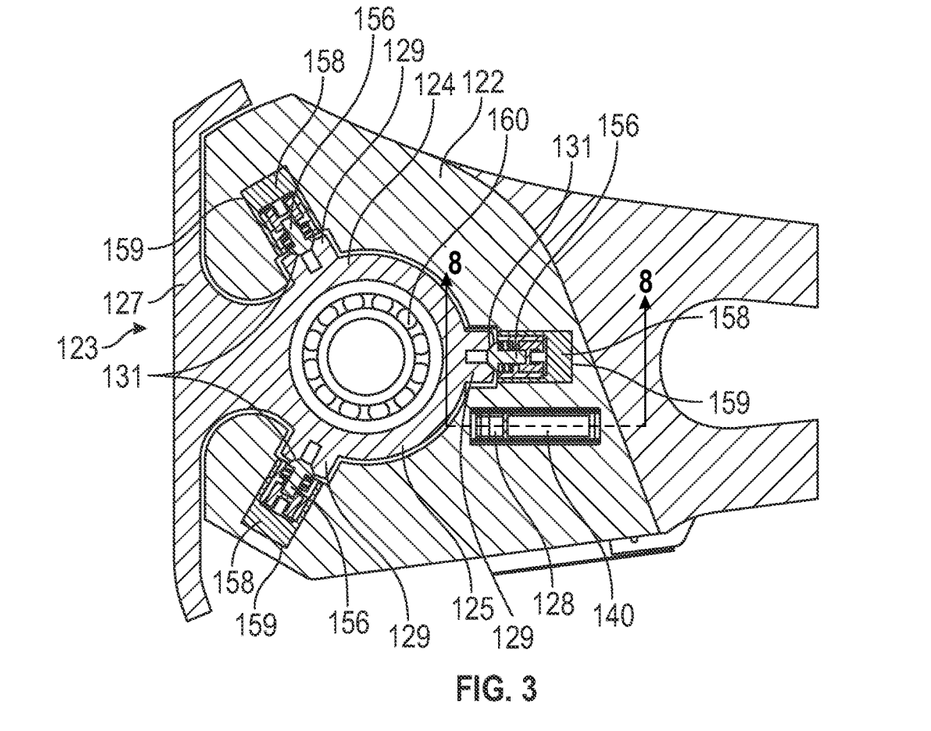
FIG. 3 is a top view of a portion of the head stack assembly of FIG. 2.

As can be seen in FIG. 2, arm 122 is coupled to actuator 110 via a pivot block 123. Pivot block 123 has a generally cylindrical front portion 125 to which actuator arm 122 is coupled and a substantially rectangular rear portion 127 to which actuator 110 is coupled. It should be noted that the pivot block 123 may take on other suitable shapes in other embodiments. The cylindrical front portion 125 of pivot block 123 is rotatably mounted around shaft 124, with a bearing 160 included between the cylindrical front portion 125 and the shaft 124. In the exemplary embodiment of FIG. 2, an outer surface of the cylindrical front portion 125 includes three rectangular protrusions 129 spaced 120 degrees apart as shown in FIG. 3, which is a top view showing portions of arm 122 and pivot block 123. As can be seen in FIG. 2, each rectangular protrusion 129 includes eleven pin holes 131A-131K positioned vertically (e.g., in a column) such that each different pin hole's 131 vertical position corresponds to a location of a different disc 104 (shown in FIG. 1) mounted on spindle 105 (shown in FIG. 1). Accordingly, since three rectangular protrusions 129 are employed, at any of the eleven vertical positions, there are three pin holes 131—one pin hole 131 in each of the three different rectangular protrusions 129—in a same horizontal plane as shown in FIG. 3. Each hole 131 is sized to receive a locking key or peg 156 of a lock 158. As can be seen in FIGS. 2 and 3, each of three locks 158 is within a cavity 159 in actuator arm 122. Each different one of the three cavities 159 including the lock 158 is positioned opposite a different rectangular protrusion 129. Such an arrangement with three locks 158 in a same horizontal plane helps prevent the actuator arm 122 from tilting during operation of DSD 100. Since, in the illustrated configuration, there are eleven pin holes 131 in each of the three rectangular protrusions 129, with three pin holes 131—one from each of the three different rectangular protrusions 129—in a same horizontal plane, each set of three coplanar pin holes 131 provides a different one of eleven discrete vertical positions for locking the actuator arm 122, where upper arm plate 122a and lower arm plate 122b may be placed above and below one of the eleven discs 104. In a default configuration, the actuator arm 122 is locked in one of the eleven vertical positions. When vertical motion of the actuator arm 122 is desired, the locks 158 are energized to retract pegs 156 from coplanar pin holes 131, so that the actuator arm 122 can move under the motive of elevator 140. It should be noted that different embodiments may employ different actuator arm 122/pivot block 123 configurations with any suitable number of locks 158 and corresponding protrusions 129 that may have any desired shape, and that may be arranged in any suitable manner around front potion 125, which may be cylindrical (as shown in FIGS. 2 and 3) or may have any other desired shape.

In the embodiment of FIG. 2, elevator 140 enables vertical motion of the actuator arm 122 between an upper hard stop 133 and a lower hard stop 135. In an exemplary embodiment, elevator 140 is an ultrasonic piezoelectric actuator that travels along a rail 128. A position encoder 137 may be affixed to the rail 128. One suitable position encoder 137 is commercially available from Posic, Switzerland as a linear inductive encoder. Such a position encoder includes a linear scale and an encoder that is an integrated circuit in a printed circuit board (PCB) housing. The position encoder 137 helps with determining a vertical position of the actuator arm 122 and is thereby useful for determining an extent to which the elevator 140 should move the actuator arm 122 to reach a desired vertical position. As indicated above, once the actuator arm 122 is moved to the desired vertical position by elevator 140, it is locked in that position by locks 158.

Figure 4:
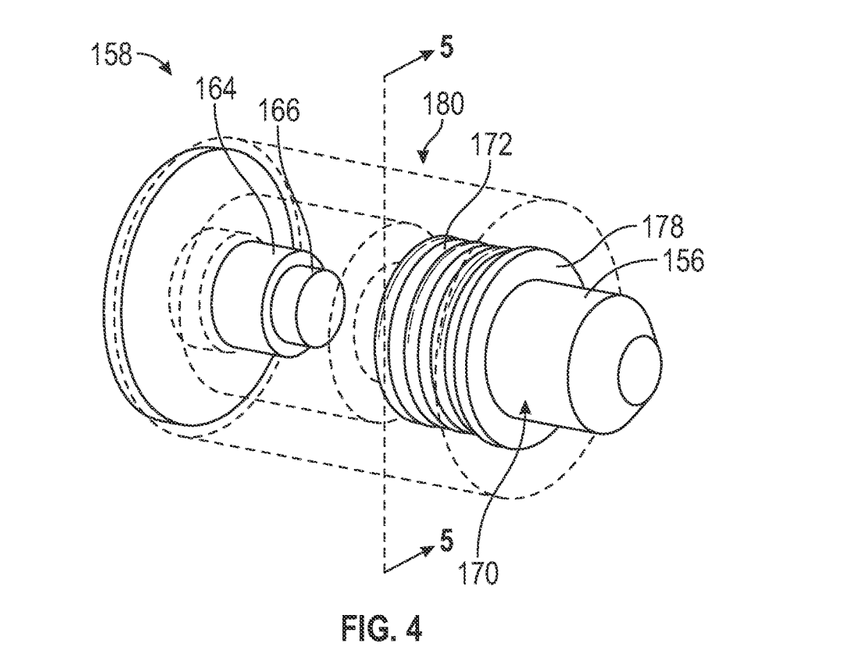
FIG. 4 is a partially transparent perspective view of an exemplary lock.
Figure 5:
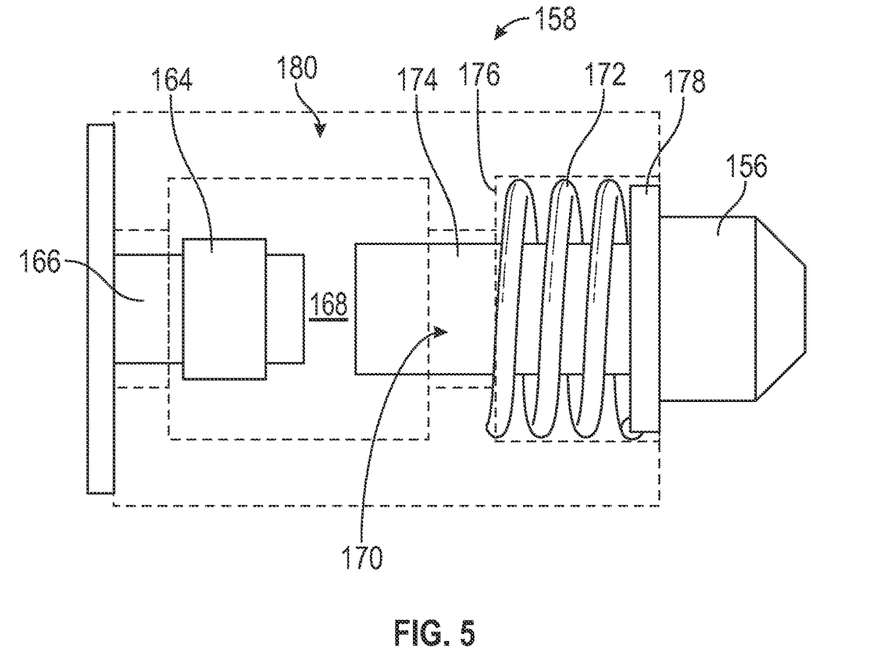
FIG. 5 is a cross-sectional view, taken along line 5-5 of FIG. 4, of the lock in a default protruding, locked configuration.
Figure 6:
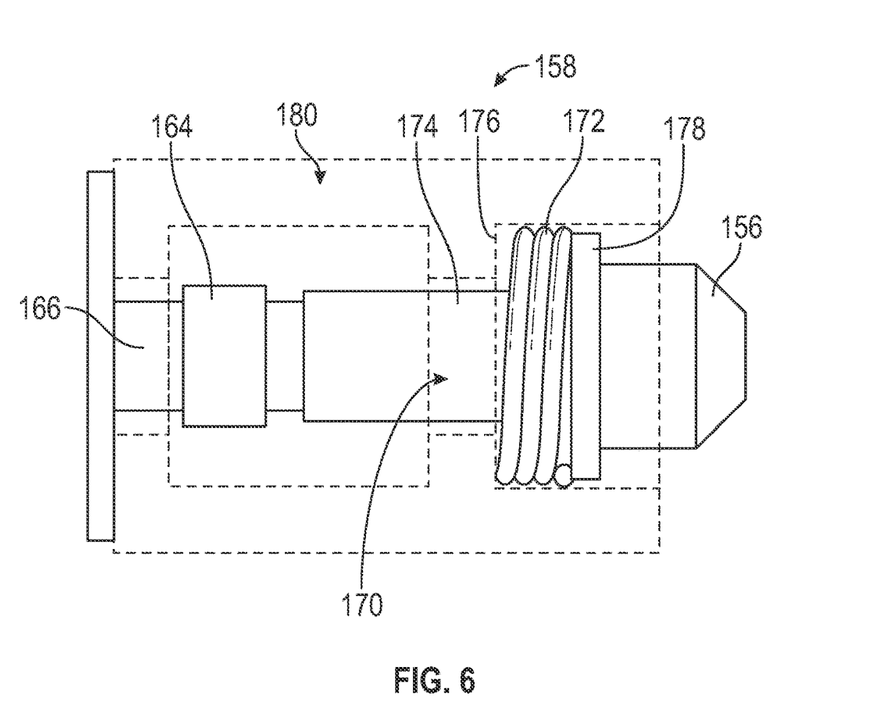
FIG. 6 is a cross-sectional view of the lock in an energized, retracted and unlocked configuration.
Figure 7:
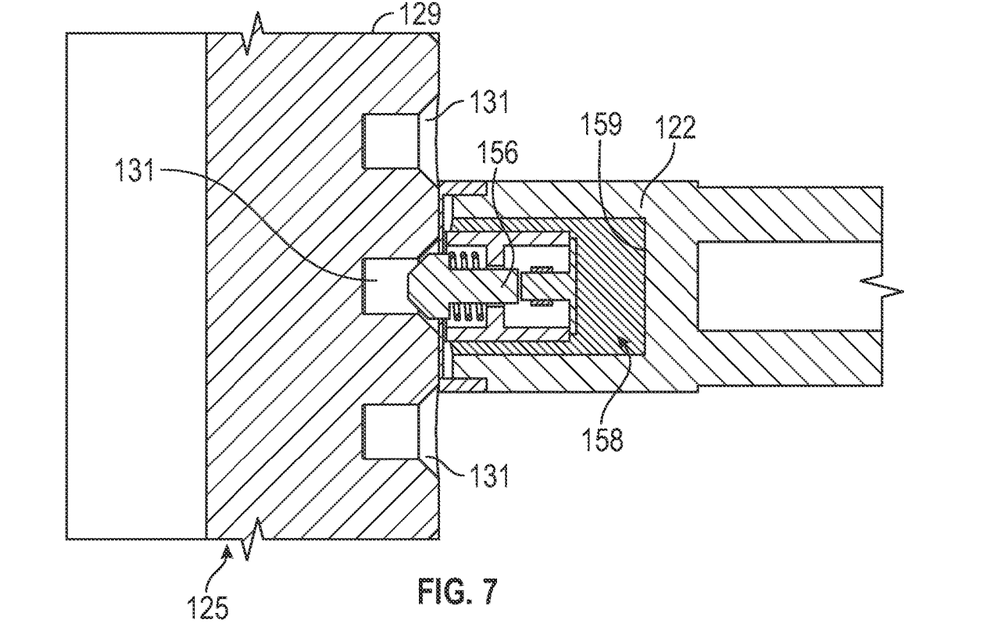
FIG. 7 is a partial cross-sectional view, taken along line 7-7 of FIG. 2, of an assembly including a lock, a pivot block and an actuator arm, in a locked configuration.

FIG. 4 is a partially transparent view of an exemplary lock 158. FIG. 5 is a cross-sectional view, taken along line 5-5 of FIG. 4, of the lock 158 in a default protruding, locked configuration. FIG. 6 is a cross-sectional view of the lock 158 in an energized, retracted and unlocked configuration. FIG. 7 is a partial cross-sectional view, taken along line 7-7 of FIG. 2, of an assembly including a lock 158 with front portion 125 of pivot block 123 and actuator arm 122, in a locked configuration.

In an exemplary embodiment, lock 158 includes an electromagnetic coil 164 surrounding an iron bolt 166. In the default configuration shown in FIG. 5, when the electromagnetic coil 164 is not energized, a gap 168 is maintained between the bolt 166 and an iron key 170. A helical spring 172 surrounds a portion of a shaft 174 of key 170, the spring being confined between shoulder 176 of key body 180 and flange 178 of key 170.

As shown in FIG. 6, to retract peg 156 into body 180 of key 158, the electromagnetic coil 164 is energized so that the iron bolt 166 becomes a magnet and attracts the iron shaft 174 of key 170. Thereby, the gap 168 is closed and spring 172 is compressed between flange 178 of key 170 and shoulder 176 of lock body 180. This axial motion of the key 170 within body 180 of lock 158 retracts peg 156 sufficiently to remove the peg 156 from pin hole 131 of protrusion 129. While a portion of peg 156 may still protrude outside body 180, the peg 156 is withdrawn from pin hole 131, thereby unlocking the actuator arm 122 from the pivot block 123. In an exemplary embodiment, head circuitry 132 for the actuator 110 controls all of the three locks 158 in concert. Therefore, all of the locks 158 are either energized (unlocked) or de-energized (locked) in unison. With locks 158 energized, thereby withdrawing locking keys or pegs 156 from the respective pin holes 131, the actuator arm 122 is thereby freed to move in a z direction up and down the pivot block 123 under the motive of the elevator 140. When a suitable position of the actuator arm 122 on the pivot block 123 has been reached, the electromagnetic coil 164 for each of the locks 158 of the actuator assembly 110 is thereby unenergized and the spring returns to its uncompressed configuration, thereby biasing to the default locked position shown in FIG. 5 to maintain the actuator arm 122 in the selected vertical position on pivot block 123.

Figure 8:
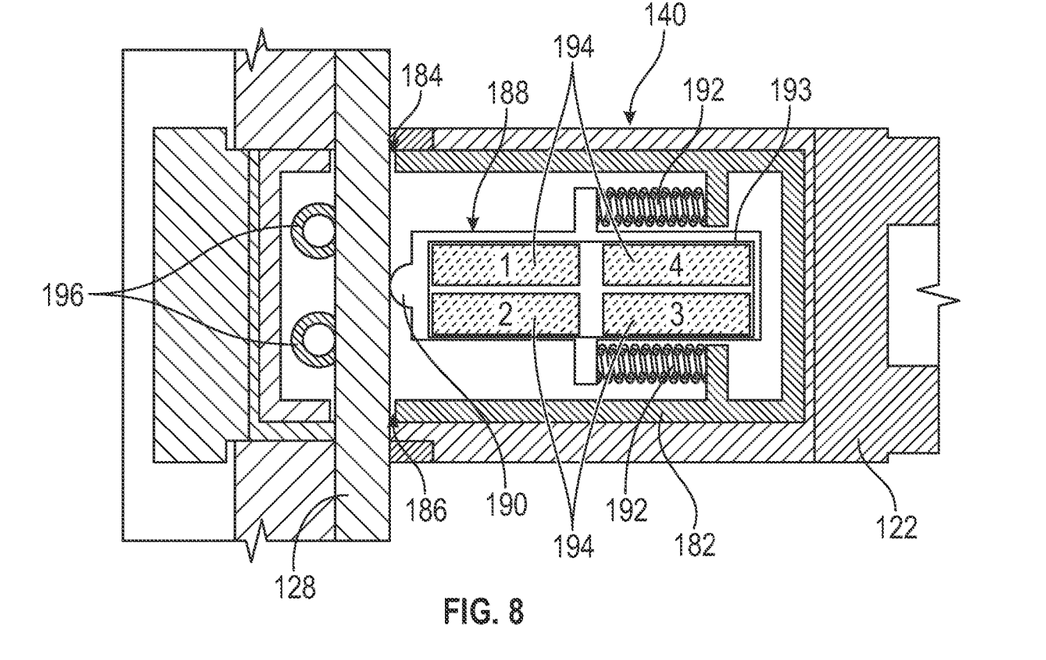
FIG. 8 is a partial cross-sectional view, taken along line 8-8 of FIG. 3, of an assembly including an ultrasonic piezoelectric actuator embedded in an actuator arm.

FIG. 8 is a partial cross-sectional view, taken along line 8-8 of FIG. 3, of an assembly including an ultrasonic piezoelectric actuator elevator 140 embedded in actuator arm 122 in accordance with one embodiment. Ultrasonic piezoelectric actuator 140 includes a housing 182 that may be within a cavity in actuator arm 122. Housing 182 includes openings (e.g., an upper opening 184 and a lower opening 186) that allow for movement of the ultrasonic piezoelectric actuator 140 along rail 128. Within housing 182, the ultrasonic piezoelectric actuator 140 includes a stator 188 having a tip 190 that is in contact with rail 128, and pre-load springs 192. Stator 188 may include a piezoelectric material layer 193 to which electrodes 194 are coupled. In FIG. 8, four electrodes numbered 1-4 are shown on one side of the piezoelectric material layer 193. However, four more electrodes may be included on an opposite side of the piezoelectric material layer 193. In general, when voltages are applied to the electrodes 1-4, the contact tip 190 of the stator 188 generates motion (e.g., elliptical motion), which causes the stator 188 to move along the rail 128. Rollers 196 positioned on the opposite side of rail 128 compared to tip 190 assist in maintaining linear movement of the ultrasonic piezoelectric actuator 140 along rail 128. Since the ultrasonic piezoelectric actuator 140 is a part of the actuator arm 122 assembly, the actuator arm 122 is moved vertically by movement of the ultrasonic piezoelectric actuator 140.

In a particular embodiment, electrodes 1 and 3 form a first electrode pair to which a first alternating current (AC) signal is applied, and electrodes 2 and 4 form a second electrode pair to which a second AC signal is applied. In the interest of simplification, the AC voltage sources are not shown. In general, any suitable AC voltage sources that are capable of supplying the first and second AC signals at approximately the natural frequency of the piezoelectric material layer 193 may be employed. In a particular configuration, if the first AC signal applied to the first electrode pair 1 and 3 leads the second AC signal applied to the second electrode pair 2 and 4 by 90 degrees, the ultrasonic piezoelectric actuator 140 moves down. If the first AC signal applied to the first electrode pair 1 and 3 lags the second AC signal applied to the second electrode pair 2 and 4 by 90 degrees, the ultrasonic piezoelectric actuator 140 moves up. As indicated above, the motion of the ultrasonic piezoelectric actuator 140 is generated by elliptical oscillation of the contact tip 190. There are multiple methods for adjusting the speed of movement of the ultrasonic piezoelectric actuator 140. The different speed-adjustment methods may be used individually or in combination. Three examples of speed-adjustment methods for the ultrasonic piezoelectric actuator 140 are listed below.

1) Adjust the first and second AC voltage signal levels provided to the electrodes 1-4. Higher AC voltage levels provide greater speeds.
2) Adjust the signal frequency of the first and second AC voltage signals. The closer the AC voltage signal frequency is to the natural frequency of the piezoelectric material layer 193, the higher the speed.
3) Adjust the phase difference between the first AC signal applied to the first electrode pair 1 and 3 and the second AC signal applied to the second electrode pair 2 and 4. It should be noted that no motion of the ultrasonic piezoelectric actuator 140 takes place when the phase difference between the first and second AC signals is 0. Position control of ultrasonic piezoelectric actuator 140 may be carried out using closed-loop control that employs position information from position encoder 137.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a stack of discs mounted on a spindle;
   a pivot block rotatably mounted around a shaft;
   an arm having first and second ends, the first end supporting a head, and the second end movably attached to the pivot block; and
   an ultrasonic piezoelectric actuator configured to move the arm along the pivot block to enable the head to interact with data storage surfaces of the discs.

2. The data storage device of claim 1 and wherein:
   the pivot block comprises at least one column comprising a plurality of vertically-arranged pin holes having different locations, wherein the different locations of the vertically-arranged pin holes correspond to positions of respective discs of the stack of discs; and
   the second end of the arm is releasably attachable to the pivot block by insertion of a key of a locking mechanism coupled to the arm into any one of the plurality of vertically-arranged pin holes, thereby enabling the head to access data storage surfaces of the respective discs.

3. The data storage device of claim 2 and wherein the locking mechanism comprises an electromagnetic lock.

4. The data storage device of claim 2 and wherein:
   the at least one column is one of three columns of vertically-arranged pin holes, the three columns spaced 120 radial degrees apart on the pivot block;
   the locking mechanism is one of three locking mechanisms in a same horizontal plane perpendicular to the shaft; and
   each one of the three locking mechanisms is positioned opposite a respective one of the three columns of vertically-arranged pin holes.

5. The data storage device of claim 1 and wherein a front portion of the pivot block comprises a vertical rail along which the ultrasonic piezoelectric actuator is configured to move.

6. The data storage device of claim 5 and wherein the ultrasonic piezoelectric actuator comprises at least one roller that is in contact with the rail and enables movement of the ultrasonic piezoelectric actuator along the rail.

7. A data storage device comprising:
   a first disc mounted on a spindle, the first disc having a first data storage surface;
   a pivot block rotatably mounted around a shaft;
   an arm comprising first and second ends, the first end supporting a head; and
   at least one electromagnetic lock configured to releasably lock the second end of the arm at a first location along the pivot block, such that when the at least one electromagnetic lock locks the second end of the arm at the first location, the arm is rotatable by the pivot block to enable the head to interact with the first data storage surface.

8. The data storage device of claim 7 and wherein:
   the first disc is one of a plurality of discs in a stack, and
   the second end of the arm is moveably attached to the pivot block, thereby enabling the head to access other data storage surfaces of different discs of the plurality of discs.

9. The data storage device of claim 8 and further comprising an ultrasonic piezoelectric actuator configured to move the arm along the pivot block to enable the head to access the other data storage surfaces.

10. The data storage device of claim 9 and wherein:
    the pivot block comprises at least one column comprising a plurality of vertically-arranged pin holes having different locations, wherein the different locations of the vertically-arranged pin holes correspond to positions of respective discs of the stack of discs; and
    the second end of the arm is releasably attachable to the pivot block by insertion of a key of the at least one electromagnetic lock, which is coupled to the arm, into any one of the plurality of vertically-arranged pin holes, thereby enabling the head to access the data storage surfaces of the respective discs.

11. The data storage device of claim 10 and wherein:
the at least one column is one of three columns of vertically-arranged pin holes, the three columns spaced 120 radial degrees apart on the pivot block;
the at least one electromagnetic lock is one of three electromagnetic locks in a same horizontal plane perpendicular to the shaft; and
each one of the three electromagnetic locks is positioned opposite a respective one of the three columns of vertically-arranged pin holes.

12. The data storage device of claim 10 and wherein a front portion of the pivot block comprises a vertical rail along which the ultrasonic piezoelectric actuator is configured to move.

13. The data storage device of claim 12 and wherein the ultrasonic piezoelectric actuator comprises at least one roller that is in contact with the rail and enables movement of the ultrasonic piezoelectric actuator along the rail.

14. A data storage device comprising:
a stack of discs mounted on a spindle;
a pivot block rotatably mounted around a shaft, the pivot block comprising a rear portion and a generally cylindrical front portion that is positioned around the shaft, the front portion having an exterior that includes at least one column of vertically-arranged pin holes, wherein locations of the different vertically-arranged pin holes correspond to locations of respective discs of the stack of discs; and
an arm having first and second ends, the first end supporting a head configured to interact with different data storage surfaces of the stack of discs, and the second end releasably attachable to the pivot block by insertion of a key of a locking mechanism coupled to the arm into any of the different vertically-arranged pin holes, thereby enabling the head to access the different data storage surfaces.

15. The data storage device of claim 14 and wherein the locking mechanism comprises an electromagnetic lock.

16. The data storage device of claim 14 and wherein the at least one column of vertically-arranged pin holes comprises three columns of vertically-arranged pin holes spaced 120 degrees apart on the exterior of the front portion of the pivot block, and wherein the locking mechanism is one of three locking mechanisms in a same horizontal plane perpendicular to the shaft with each different one of the three locking mechanisms being positioned opposite a different column of the vertically-arranged pin holes.

17. The data storage device of 14 and further comprising a linear actuator configured to move the arm along the pivot block to enable the head to interact with the different data storage surfaces.

18. The data storage device of claim 17 and wherein the linear actuator comprises an ultrasonic piezoelectric actuator.

19. The data storage device of claim 17 and wherein the front portion of the pivot block comprises a vertical rail along which the linear actuator is configured to move.

20. The data storage device of claim 19 and wherein the linear actuator comprises at least one roller that is in contact with the rail and enables movement of the linear actuator along the rail.

* * * * *

UNITED STATES PATENT AND TRADEMARK OFFICE
CERTIFICATE OF CORRECTION

| | | |
|---|---|---|
| PATENT NO. | : 11,727,957 B1 | Page 1 of 1 |
| APPLICATION NO. | : 17/837185 | |
| DATED | : August 15, 2023 | |
| INVENTOR(S) | : YiChao Ma et al. | |

It is certified that error appears in the above-identified patent and that said Letters Patent is hereby corrected as shown below:

In the Claims

Column 10, Claim 17, Line 18, please insert the word --claim-- between "of" and "14".

Signed and Sealed this
Twenty-fourth Day of October, 2023

Katherine Kelly Vidal
*Director of the United States Patent and Trademark Office*